United States Patent [19]

Jablonski

[11] 4,241,522

[45] Dec. 30, 1980

[54] TEACHING AID

[76] Inventor: Raymond C. Jablonski, 1879 Coventry Dr., Memphis, Tenn. 38127

[21] Appl. No.: 27,778

[22] Filed: Apr. 6, 1979

[51] Int. Cl.³ .............................................. G09B 1/28
[52] U.S. Cl. .................................... 434/405; 434/199
[58] Field of Search ............. 35/31 A, 31 E, 75, 31 B; 273/272

[56] References Cited

U.S. PATENT DOCUMENTS

| | | | |
|---|---|---|---|
| 1,285,038 | 11/1918 | Chance | 35/75 X |
| 1,525,342 | 2/1925 | Van Order | 35/75 X |
| 2,974,433 | 3/1961 | Litzinger | 273/272 X |
| 3,491,460 | 1/1970 | Novak | 35/31 A |
| 3,739,068 | 6/1973 | Harkins | 35/75 X |
| 3,947,036 | 3/1976 | Kupec | 35/75 X |

FOREIGN PATENT DOCUMENTS 961792 11/1949 France ...................................... 35/31 A Primary Examiner—Harland S. Skogquist
Attorney, Agent, or Firm—Walker & McKenzie

[57] ABSTRACT

A teaching aid procreated to develop learner participation in mental computation of number combinations involving all of the elements of basic arithmetic. Four elongated slide members are permanently housed within the confines of a frame member. Each slide member has the numerical figure indicia of from one to twelve printed thereon. The frame means has four windows therein. Each window is associated with one of the slide members whereby movement of the slide members will cause various numbers to be viewable therethrough. Arithmetic function indicia is printed on the frame member between the windows whereby various arithmetic problems can be displayed by movement of the slide members to cause selected numerical figure indicia to be viewable through the windows.

2 Claims, 9 Drawing Figures

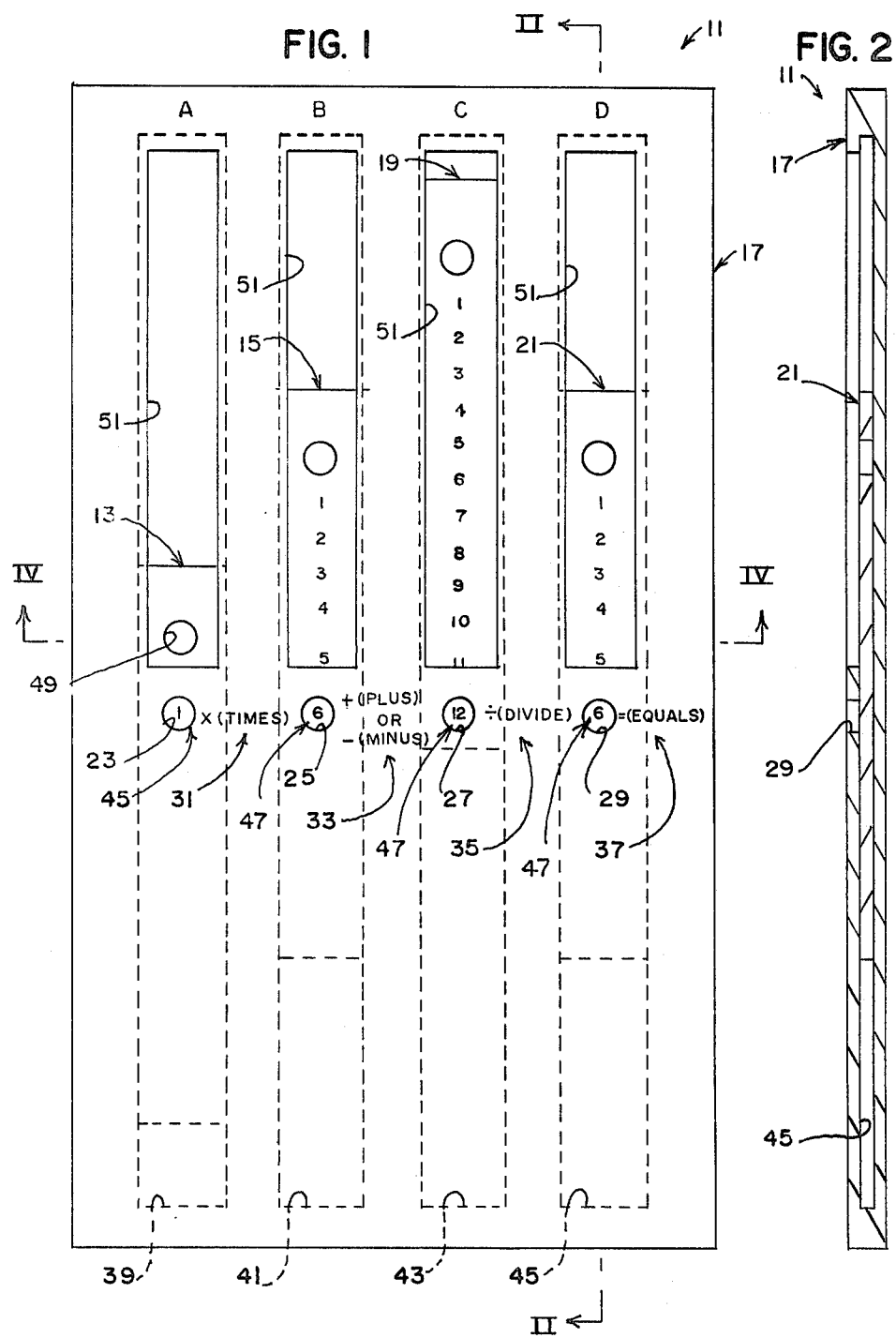

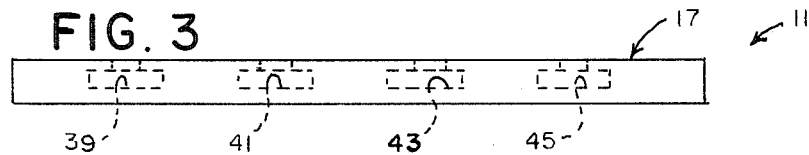
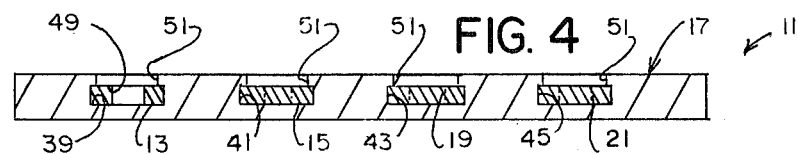
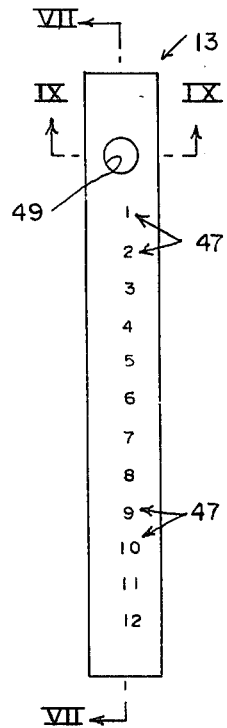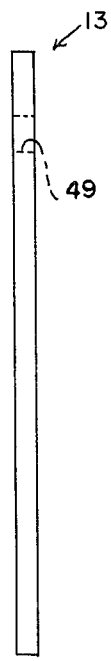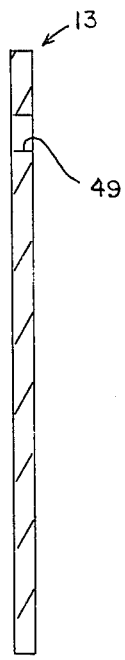
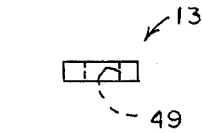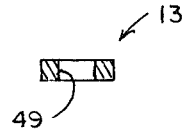

TEACHING AID

BACKGROUND OF THE INVENTION

1. Field of the Invention

The present invention relates generally to teaching aids and more specifically to a teaching aid for developing learner participation in mental computation of number combinations involving elements of basic arithmetic.

2. Description of the Prior Art

Various teaching aids and the like have heretofore been developed. See, for example, Finch, U.S. Pat. No. 275,475; Gillis, U.S. Pat. No. 416,593; Erwin, U.S. Pat. No. 711,486; Oldroyd, U.S. Pat. No. 894,043, Newman, U.S. Pat. No. 1,028,378; Robbins, U.S. Pat. No. 1,211,625; Warneke, U.S. Pat. No. 3,477,146; Bianchi, U.S. Pat. No. 3,491,193; Tarrant, U.S. Pat. No. 3,758,971; and Garruto, U.S. Pat. No. 3,969,832. None of the above patents disclose or suggest the present invention.

SUMMARY OF THE INVENTION

The present invention is directed towards providing a teaching aid which develops learner participation in mental computation of number combinations involving elements of basic arithmetic.

The teaching aid of the present invention includes, in general, a plurality of slide means and a frame means for slidably receiving the plurality of slide means. The frame means has a plurality of window apertures therein for allowing a portion of each slide means to be viewed therethrough. Arithmetic function indicia is located between the window apertures and a plurality of numerical figure indicia is located on each slide means. Movement of the slide means within the frame means will cause various ones of the numerical figure indicia to be aligned with the window aperture.

One object of the present invention is to provide a basic arithmetic teaching technique through which hand coordination and thought processes are simultaneously developed. Another object of the present invention is to provide for and cause the learner to analyze and select a variety of mathmatical combinations in an effort to solve a problem. Another object of the present invention is to provide a device which offers the facility to learn multiplication tables, multiplication factors, addition, subtraction, and division in nearly one quarter of a million problem combinations. Another object of the present invention is to provide a teaching aid designed for third grade level quality education for the mastery of basic arithmetic at the elementary school level. Another object of the present invention is to provide for the proficiency and competency evaluation for a fourth grade level learner in the development of "whole number" problem concepts from a −11 to a +156. Another object of the present invention is to provide for the proficiency and competency evaluation for a fifth grade level learner in the development of numbers with fractions. Another object of the present invention is to provide a device that can be used for "enrichment" learning for second grade learners, or as a deficiency make-up technique for fifth, sixth or higher grade pupils as well as adult learners. Another object of the present invention is to provide a device that serves as a reverse teaching technique wherein the answer is provided and the learner develops the problem. This is a valuable asset to learning because it develops the "decision-making" processes which ultimately benefits the learner. Another object of the present invention is to provide a teaching aid that utilizes a constant formula technique. That is, the formula utilized by the preferred embodiment of the present invention is always multiplication followed by addition or subtraction followed by division.

BRIEF DESCRIPTION OF THE DRAWINGS

FIG. 1 is a front elevational view of the teaching aid of the present invention.

FIG. 2 is a sectional view as taken on line II—II of FIG. 1.

FIG. 3 is a bottom plan view of FIG. 1.

FIG. 4 is a sectional view as taken on line IV—IV of FIG. 1.

FIG. 5 is a front elevational view of one of the slide means of the teaching aid of the present invention.

FIG. 6 is a side elevational view of FIG. 5.

FIG. 7 is a sectional view as taken on line VII—VII of FIG. 5.

FIG. 8 is a bottom plan view of FIG. 5.

FIG. 9 is a sectional view as taken on line IX—IX of FIG. 5.

DESCRIPTION OF THE PREFERRED EMBODIMENT

The teaching aid 11 of the present invention is used to develop learner participation in mental computations of number combinations involving elements of basic arithmetic. The teaching aid 11 includes, in general, a first slide means 13, a second slide means 15, and a frame means 17 for slidably receiving the first and second slide means 13, 15. Preferably, the teaching aid 11 includes a third slide means 19 and a fourth slide means 21 slidably received by the frame means 17.

The frame means 17 has a first window aperture 23 therein for allowing a portion of the first slide means 13 to be viewed therethrough and has a second window aperture 25 therein for allowing a portion of the second slide means 15 to be viewed therethrough. The frame means 17 preferably has a third window aperture 27 therein for allowing a portion of the third slide means 19 to be viewed therethrough and a fourth window aperture 29 therein for allowing a portion of the fourth slide means 21 to be viewed therethrough. The frame means 17 has arithmetic function indicia 31 located between the first and second window apertures 23, 25. For example, the arithmetic function indicia 31 may consist of appropriate indicia to signify the arithmetic function of multiplication (times). Preferably, the frame means 17 includes arithmetic function indicia 33 located between the second and third window apertures 25, 27. For example, the arithmetic function indicia 33 may consist of appropriate indicia to indicate the arithmetic functions of addition (plus) and/or subtraction (minus). The frame means 17 preferably includes arithmetic function indicia 35 located between the third and fourth window apertures 27, 29. For example, the arithmetic function indicia 35 may consist of appropriate indicia for indicating the arithmetic function of division. The frame means 17 preferably includes indicia means 37 located to the right of the fourth aperture 29 for indicating mathmatical equivalency (i.e., an equals sign). The frame means 17 has a first track means for slidably receiving the first slide means 13 for allowing the first slide means 13 to be moved with respect to the first window aperture 23 and has a second track means for slidably receiving the second slide means 15 and for allowing the second slide means 15 to be moved with respect to the second window aperture 25. The frame means 17 preferably has a third track means for slidably receiving the third slide means 19 and for allowing the third slide means 19 to be moved with respect to the third window aperture 27 and preferably has a fourth track means 45 slidably receiving the fourth slide means 21 and for allowing the fourth slide means 21 to be moved with respect to the fourth window aperture 29. The frame means 17 preferably has a first internal cavity 39 for defining the first track means, a second internal cavity 41 for defining the second track means, a third internal cavity 43 for defining the third track means and a fourth internal cavity 45 for defining the fourth track means. The first window aperture 23 preferably communicates with the first internal cavity 39. The second window aperture 25 preferably communicates with the second internal cavity 41. The third window aperture 27 preferably communicates with the third internal cavity 43. The fourth window aperture 29 preferably communicates with the fourth internal cavity 45. It should be noted that the frame member 17 may include indicia means for identifying the slide means 13, 15, 19, 21. That is, indicia such as "A" may be provided on the frame means 17 adjacent the first slide means 13 as shown in FIG. 1 whereby the first slide means 13 can be easily identified. Likewise, indicia such as "B", "C", and "D" may be provided on the frame means 17 adjacent the second, third and fourth slide means 15, 19, 21 respectively as shown in FIG. 1.

The first, second, third and fourth slide means 13, 15, 19, 21 are substantially identical to one another and the following description of the first slide means 13 should suffice for a description of all. The first slide means 13 is preferably elongated and has a plurality of numerical figure indicia 47 thereon. For example, the first slide means 13 may include a plurality of numerical figure indicia 47 thereon for indicating the numerical figures of the numbers 1 through 12, inclusive, positioned thereon in numerical order as clearly shown in FIG. 5. Thus, by moving the first slide means 13 with respect to the first window aperture 23, various ones of the numerical figure indicia 47 can be aligned with the first aperture 23. The first slide means 13 preferably has a handle means for use in moving the first slide means 13 within the first internal cavity 39 with respect to the first window aperture 23. The handle means preferably consists simply of an aperture 49 in the first slide means 13. The frame means 17 preferably has a plurality of slots 51 communicating with the first, second, third and fourth internal cavities 39, 41, 43, 45 for allowing access to and movement of the handle means of the first, second, third and fourth slide means 13, 15, 19, 21. More specifically, the end of a pencil or the like can be inserted through the slots 51 and into the aperture 49 whereby up and down movement of the pencil will cause corresponding up and down movement of the slide means. The frame means 17 is preferably constructed so that the entire length of the slide means 13, 15, 19, 21 are always positioned and constantly located entirely within the periphery of the frame means 17 regardless of the specific position of the slide means 13, 15, 19, 21. For example, the slide means 13 is shown in FIG. 1 in one extreme position with the numerical figure indicia of "1" aligned with the window aperture 23. Likewise, the slide means 19 is shown in FIG. 1 in the other extreme position with the numerical figure indicia of "12" aligned with the window aperture 27. The opposite ends of the slide means 13, 19 in the two extreme positions are within the periphery of the frame means 17 and protected thereby.

The teaching aid 11 may be constructed in any manner apparent to those skilled in the art. For example, the slide means 13, 15, 19, 21 and the frame means 17 may be constructed of a substantially rigid cardboard-like material in any manner apparent to those skilled in the art with the various indicia means printed thereon.

There are numerous ways of using the teaching aid 11 which should now be apparent to those skilled in the art. For example, an instructor may provide a desired answer, for example, "3", and instruct the learner to move the slide means 13, 15, 19, 21 so that the arithmetic computation indicated by teaching aid 11 will result in that specific answer. Thus, to receive the answer of "3", the learner may move the first slide means 13 until the numerical figure indicia of "1" is aligned with the first window aperture 23, may move the second slide means 15 until the numerical figure indicia of "6" is aligned with the second window aperture 25, may move the third slide means 19 until the numerical figure indicia of "12" is aligned with the third window aperture 27, and may move the fourth slide means 21 until the numerical figure indicia of "6" is aligned with the fourth window aperture 29 (see FIG. 1). The teaching aid 11 will thus indicate the arithmetic computation of 1 times 6 plus 12 divided by 6 to result in a specific answer. The specific answer can, of course, be received by many different arithmetic computations. Thus, the instructor may instruct the learner to find numerous mathmatical problems which result in a specific answer. On the other hand, the instructor may provide a partial problem and a desired answer and instruct the learner to complete the problem. Alternatively, the instructor may instruct the learner to determine the highest possible answer, the lowest possible, the lowest possible fraction, etc., which the teaching aid 11 is capable of providing. Further, the instructor may elect to only teach one arithmetic functions such as addition, subtraction, multiplication, or division.

Although the present invention has been described and illustrated with respect to a preferred embodiment, the invention is not to be so limited as changes and modifications may be made therein within the scope of the present invention.

I claim:

1. A teaching aid for developing learner participation in mental computation of number combinations using a standard formula involving a combination of the functions of basic arithmetic, said teaching aid comprising: an elongated first slide means, an elongated second slide means, an elongated third slide means, an elongated fourth slide means, and a frame means; said frame means having an elongated first internal cavity for slidably receiving said first slide means, having an elongated second internal cavity for slidably receiving said second slide means, having an elongated third internal cavity for receiving said third slide means, and having an elongated fourth internal cavity for receiving said fourth slide means; each of said slide means including a plurality of numerical figure indicia; said frame means having a first window aperture for allowing one of said numerical figure indicia of said first slide means to be viewed therethrough, having a second window aperture for allowing one of said numerical figure indicia of said second slide means to be viewed therethrough, having a third window aperture for allowing one of said numerical figure indicia of said third slide means to be viewed therethrough, and having a fourth window aperture for allowing one of said numerical figure indicia of said fourth slide means to be viewed therethrough; said frame means include first arithmetic function indicia located between said first and second window apertures, including second arithmetic function indicia located between said second and third window apertures, and including third arithmetic function indicia located between said third and fourth window apertures; said first, second and third arithmetic function indicia coacting to create a standard formula involving a combination of the functions of basic arithmetic, said first slide means being movable within said first internal cavity for allowing various ones of said numerical figure indicia of said first slide means to be aligned with said first window aperture, said second slide means being movable within said first internal cavity for allowing various ones of said numerical figure indicia of said second slide means to be aligned with said second window aperture; said third slide means being movable within said third internal cavity for allowing various ones of said numerical figure indicia of said third slide means to be aligned with said third window apertures; said fourth slide means being movable within said fourth internal cavity for allowing various ones of said numerical figure indicia of said fourth slide means to be aligned with said fourth window aperture.

2. The teaching aid of claim 1 in which said slide means are constantly located entirely within the periphery of said frame means.

* * * * *